Dec. 1, 1953  J. R. BENFORD  2,660,923
PHASE CONTRAST APPARATUS FOR METALLOGRAPHIC MICROSCOPES
Filed Oct. 6, 1949

INVENTOR.
JAMES R. BENFORD
BY

Patented Dec. 1, 1953

2,660,923

UNITED STATES PATENT OFFICE 2,660,923

PHASE CONTRAST APPARATUS FOR METALLOGRAPHIC MICROSCOPES

James R. Benford, Irondequoit Township, Monroe County, N. Y., assignor to Bausch & Lomb Optical Company, Rochester, N. Y., a corporation of New York Application October 6, 1949, Serial No. 119,973

2 Claims. (Cl. 88—39)

1

This invention relates to microscopes for examining opaque objects and more particularly it relates to improvements in the phase contrast equipment which is used in a microscope embodying a vertical illuminator.

In applying phase contrast apparatus to a metallographic type of microscope, for instance, special microscope objectives are usually required which are equipped with individual phase retarding discs and, therefore, these objectives are more costly than the standard objectives. Furthermore, various other positions in the optical system of the instrument have been used for the phase contrast apparatus in an effort to reduce the reflected flares inherent in objectives containing individual phase retarding discs. These aforesaid positions have inherent disadvantages such as limited and unevenly illuminated phase contrast fields and the necessity of changing the phase plate size for each change of power of the microscope objective.

One object of this invention is to overcome these disadvantages by providing an improved optical system for microscopes having vertical illuminators, which embody phase contrast equipment.

Another object of this invention is to provide a novel arrangement of phase contrast apparatus in the optical system of a metallographic type of microscope whereby standard microscope objectives of different powers may be used selectively without changing the phase altering disc.

Further objects and advantages may be found in the novel arrangement and combination of parts of this device as set forth hereinafter in the specification and as represented in the accompanying drawing wherein.

Figure 1:
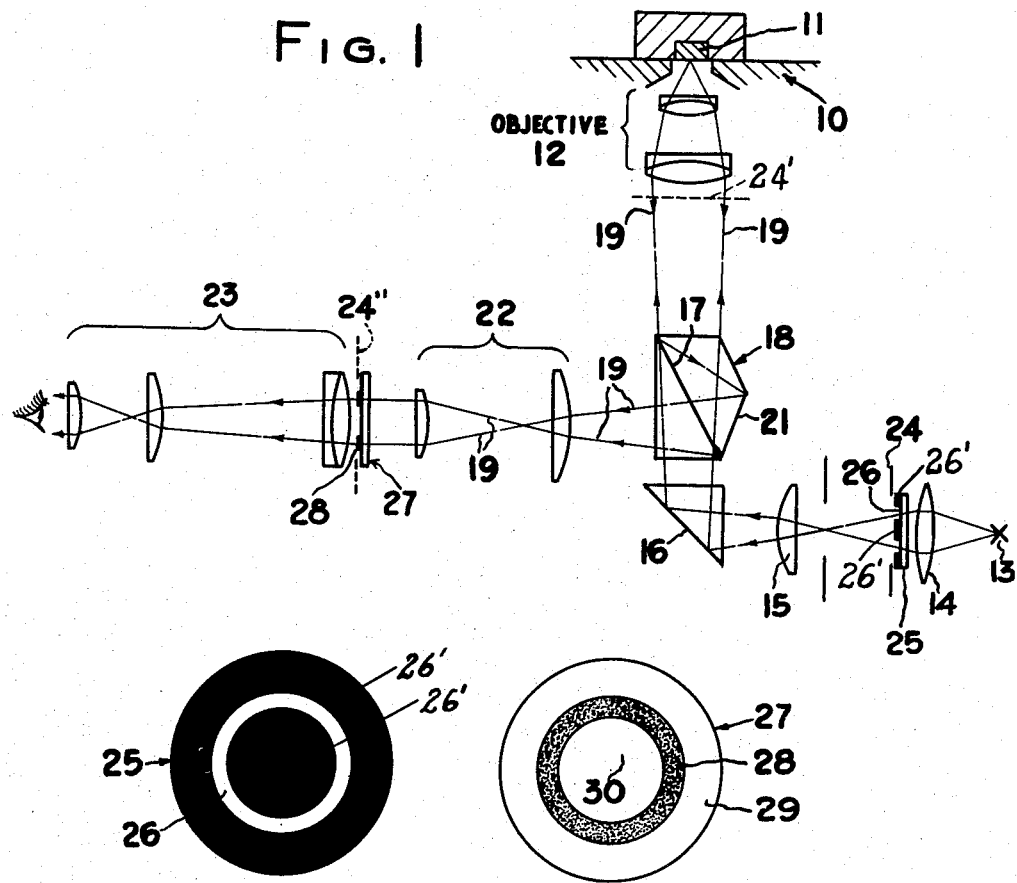
Fig. 1 is a diagrammatic illustration of one form of my invention.

In the drawing 10 represents a stage on which rests a specimen 11 having a substantially specularly reflecting surface to be examined. Under stage 10 is demountably secured a microscope objective 12 of standard type focused on specimen 11. Vertical illumination of the specimen is secured by means which essentially include a source of light 13, focused by a condenser lens 14, commonly called the condenser, a projection lens 15, and the objective 12 upon the specimen 11. In this particular design of apparatus, the light coming from the source 13 is deflected upwardly by a suitable reflector such as a reflecting prism 16.

The light rays emerging from the prism 16 traverse a partially light-transmitting mirror surface 17, which in this form of the invention is incorporated in a complex prism 18. From surface 17 the light rays proceed to the objective 12 by which they are focused on specimen 11. Image rays 19 are reflected back through the objective 12 from the specimen 11 and said rays are laterally deflected by mirror surface 17 and another mirror surface 21 on prism 18 toward the eyepiece section of the instrument. Image rays 19 are refracted into substantial parallelism in the eyepiece section of the instrument by any preferred relay lens combination here called the relay lens 22 and an image of the specimen is also formed thereby. For viewing the image of the specimen, any suitable visual observation means such as a low power telescope 23 may be provided. It may alternatively be projected directly onto a viewing screen or photographic plate without using the low power telescope.

A diaphragm 24, functioning as the aperture stop for the optical system, is located between the condenser lens 14 and the projection lens 15, and a conjugate image of this diaphragm is formed at the position 24″ adjacent to the relay lens 22 by the combined action of the intermediate lenses and reflectors in the optical path of the light rays.

Figures 2, 3:
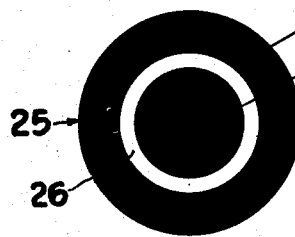
Fig. 2 is a detailed view of one part of the phase contrast apparatus.
Fig. 3 is a detailed view of another part of the phase apparatus.

According to this invention, a diaphragm disc 25 having a patterned light-transmitting area 26 preferably of annular shape is located substantially in the plane of the diaphragm 24. The areas 26′ inside and outside of the zone 26 are impervious to light and are represented in solid black shading in Figs. 1 and 2. A light phase altering plate 27, preferably formed of clear glass and having a phase shifting zone 28 thereon corresponding in shape to zone 26 on disc 25, is located substantially at a conjugate image position 24″ with respect to the aperture 24 in the eyepiece section of the instrument. The phase shifting zone 28 is illustrated by a stippled pattern in Fig. 3 and this zone is coated with materials which absorb some of the incident light and shift the phase of that part of the light which passes through this zone. Phase plate 27 also is provided with clear light-transmitting uncoated zones 29 and 30 adjoining the zone 28. The amounts of absorption and retardation in zone 28 may vary depending on the requirements of the specimen, as will be understood by those skilled in the art.

In operation, light from the source 13 passes through the condenser 14 and the annular light-transmitting zone 26 on the diaphragm disc 25 to the objective 12 by way of projection lens 15 and prisms 16 and 18. An image of the zone 26 is formed in the rear focal plane 24' of the objective 12. The objective projects this image at infinity, and the plano specimen reflects it back into the objective where it is once again imaged in the rear focal plane 24' of the objective. The size of this relayed image is independent of the objective power. Image rays 19 which are projected from said rear focal plane are deflected laterally at the prism 18 by the mirror surfaces 17 and 21 through relay lens 22 from which the image rays emerge substantially parallel. Further, the relay lens 22 forms an image of the annular pattern 26 within the boundaries of the annular phase shifting zone 28, which absorbs a large part of the incident light and changes the phase of the unabsorbed light. This is accomplished in a well-known manner by the use of suitable metallic and/or dielectric films or coatings formed on the plate 27, one of said films serving to absorb light while another film shifts the phase of the unabsorbed light. Suitable films for this purpose are disclosed in the United States patent to H. Osterberg et al. No. 2,427,689, granted September 23, 1947. Light that is diffracted by the specimen 11 passes through the clear uncoated zones 29 and 30 undisturbed to unite with light from zone 28 in presenting an image of the specimen in the field of view of the observation means 23 having accentuated contrast in its various features, depending on the surface contours of these features.

From the foregoing, it will be apparent that I am able to attain the objects of my invention because the transparent annulus of the diaphragm disc 25 is re-imaged after reflection by the specimen and directed into the eyepiece or viewing portion of the instrument so that the image is always of the same size regardless of the power of the microscope objective. The phase retarding plate 27 may, therefore, be placed in the final image plane of the transparent annulus and hence a single plate will function properly even though microscope objectives of different powers are used. Various modifications may, obviously, be made without departing from the spirit of the invention as pointed out in the appended claims.

I claim:

1. An optical system for microscopically examining a substantially specularly reflecting surface of an opaque specimen comprising an objective in optical alignment with the surface, a light source, a light transmitting reflector optically aligned with the light source and objective for directing light rays through the objective and onto the surface, a diaphragm disc between the light source and said reflector, said disc having a patterned light transmitting area which is illuminated by the source, lens means between the diaphragm disc and reflector, said lens means having its conjugate foci at the disc area and rear focal plane of the objective and imaging said area in said rear focal plane whereby the objective projects the image onto said surface which reflects it back through the objective to said focal plane, additional lens means optically aligned with said reflector and objective, said additional lens means constructed and arranged to project said image of the disc area to a plane in space, and a light phase altering plate positioned substantially in said last-named plane, said plate having a light phase altering portion which has substantially the same size and shape as and is coincident with the image of said area whereby objectives of different powers may be used selectively with the same phase altering plate.

2. An optical system for microscopically examining a substantially specularly reflecting surface of an opaque specimen comprising an objective in optical alignment with lens means for viewing an image of the specimen formed by the objective, a light source and light-transmitting reflecting means optically aligned with the objective for directing light from the source upon the surface of the specimen, a diaphragm disc positioned between said source and reflecting means, said disc having an annular light-transmitting area which is illuminated by the source, additional lens means between the disc and reflecting means for imaging said area in the rear focal plane of the objective, said additional lens means having the conjugate foci at the area and said rear focal plane whereby the objective projects the image onto said surface which reflects it back through the objective to said focal plane, relay lens means optically aligned with the objective and the first-named lens means for transmitting the image formed by the objective, said relay lens means also re-imaging said area adjacent to the first-named lens means, and a light phase altering plate positioned substantially in the plane of said re-imaged area, said plate having an annular light phase altering zone of substantially the same shape and size and coincident with said conjugate image whereby objectives of different powers may be selectively used with the same phase altering plate.

JAMES R. BENFORD.

References Cited in the file of this patent

UNITED STATES PATENTS

| Number | Name | Date |
|---|---|---|
| 2,074,106 | Foster | Mar. 16, 1937 |
| 2,096,325 | Heine | Oct. 19, 1937 |
| 2,237,943 | Lihotsky | Apr. 8, 1941 |
| 2,516,905 | Osterberg et al. | Aug. 1, 1950 |
| 2,553,108 | Osterberg et al. | May 15, 1951 |

OTHER REFERENCES

Jupnik et al., "Phase Microscopy with Vertical Illumination," Article in Journal of the Optical Society of America, vol. 38, No. 4, April 1948, pages 338–341. Published by The American Institute of Physics, New York, New York.

J. O. S. A., Osterberg: vol. 38, August 1948, pages 685–688.